United States Patent [19]

Broberg

[11] 4,020,827
[45] May 3, 1977

[54] SOLAR ENERGY COLLECTING SYSTEM

[75] Inventor: Frederick N. Broberg, Westbrook, Conn.

[73] Assignees: Paul D. Harrigan, Milford; George H. Male, North Haven; Frederick N. Broberg, Westbrook, all of Conn.

[22] Filed: Aug. 20, 1975

[21] Appl. No.: 606,103

[52] U.S. Cl. .............................. 126/271; 237/1 A
[51] Int. Cl.² ............................................ F24J 3/02
[58] Field of Search .......... 126/270, 271; 237/1 A; 165/47

[56] References Cited
UNITED STATES PATENTS

| | | | |
|---|---|---|---|
| 3,179,105 | 4/1965 | Falbel | 126/271 |
| 3,262,493 | 7/1966 | Hervey | 126/271 X |
| 3,841,302 | 10/1974 | Falbel | 126/271 |
| 3,893,506 | 7/1975 | Laing | 126/271 X |
| 3,957,109 | 5/1976 | Worthington | 126/271 X |

*Primary Examiner*—Kenneth W. Sprague
*Attorney, Agent, or Firm*—St. Onge Mayers Steward & Reens

[57] ABSTRACT

A solar energy collecting system, which may be operated to provide usable energy throughout the year, comprises a plurality of rows of elongate radiant solar energy collecting panels, each having upper and lower edges, being mounted to form an angle to the horizon and to face the sun's position at solar noon. An elongate reflector, also having upper and lower edges, compliments each row of collector panels to reflect radiant solar energy to it. The upper edge of each row of collector panels is positioned adjacent the upper edge of a reflector to define a single, inverted, generally V-shaped peak. The lower edge of each collector which forms a part of one peak is spaced from the lower edge of the reflector which forms a part of an adjacent peak to define a valley. A walkway is constructed in each valley to provide access to both the reflectors and collector panels for drainage and maintenance.

To achieve optimum year-long system operation, the height of the peaks as well as the horizontal distance beween them is such that little or no shadow falls on the collector panels near noon on the winter solstice. Further, a plane tangent to each reflector at its upper edge makes an angle with the horizon less than one-half the solar altitude during the season when maximum system performance is desired to insure that most reflected solar radiation is incident on the collector during this season.

12 Claims, 5 Drawing Figures

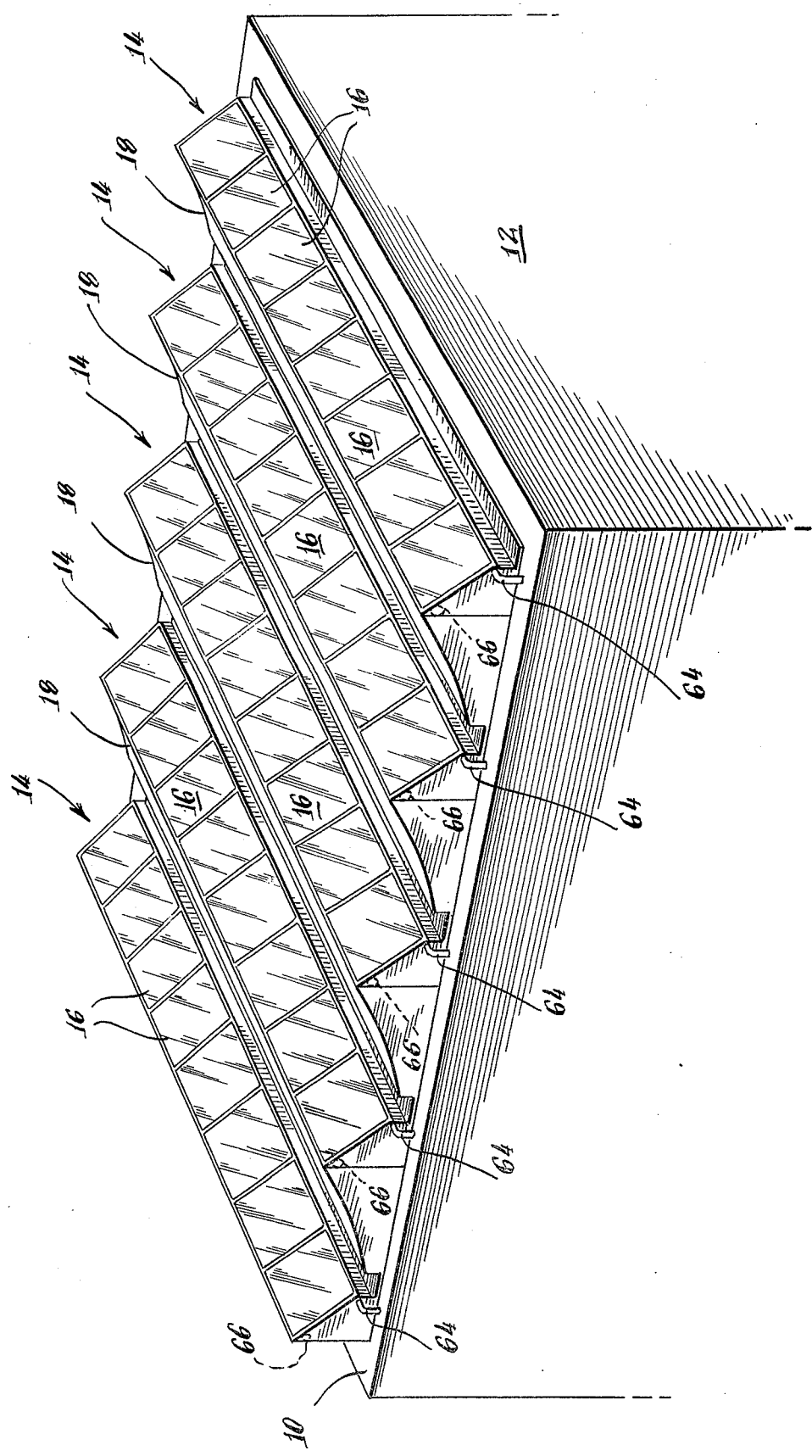

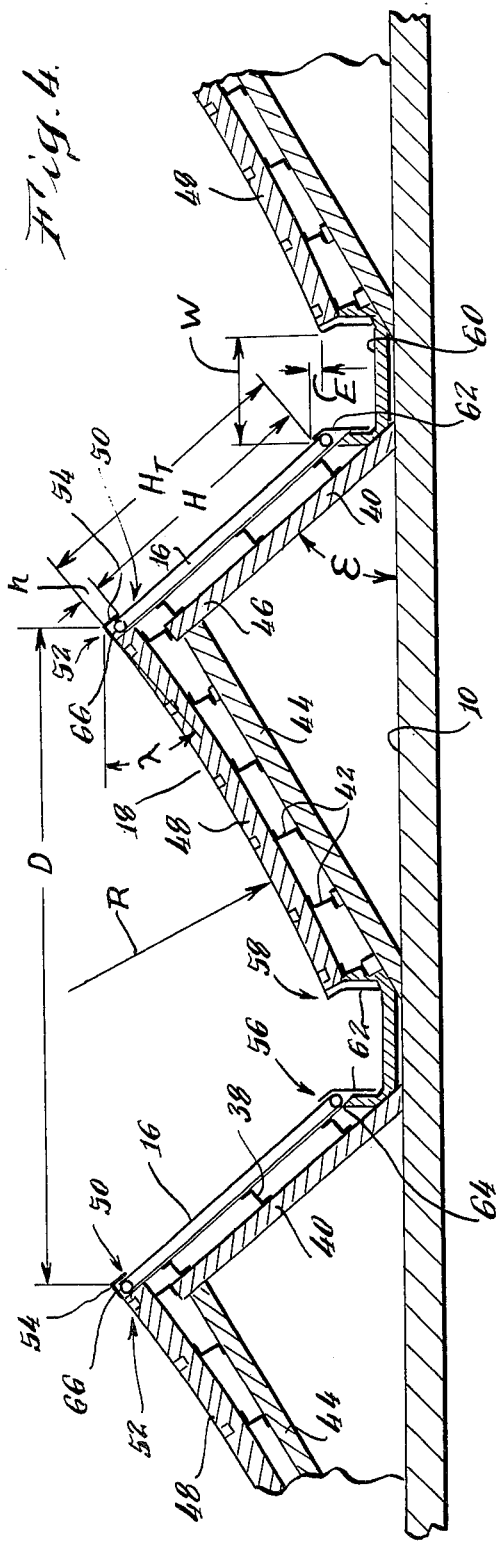
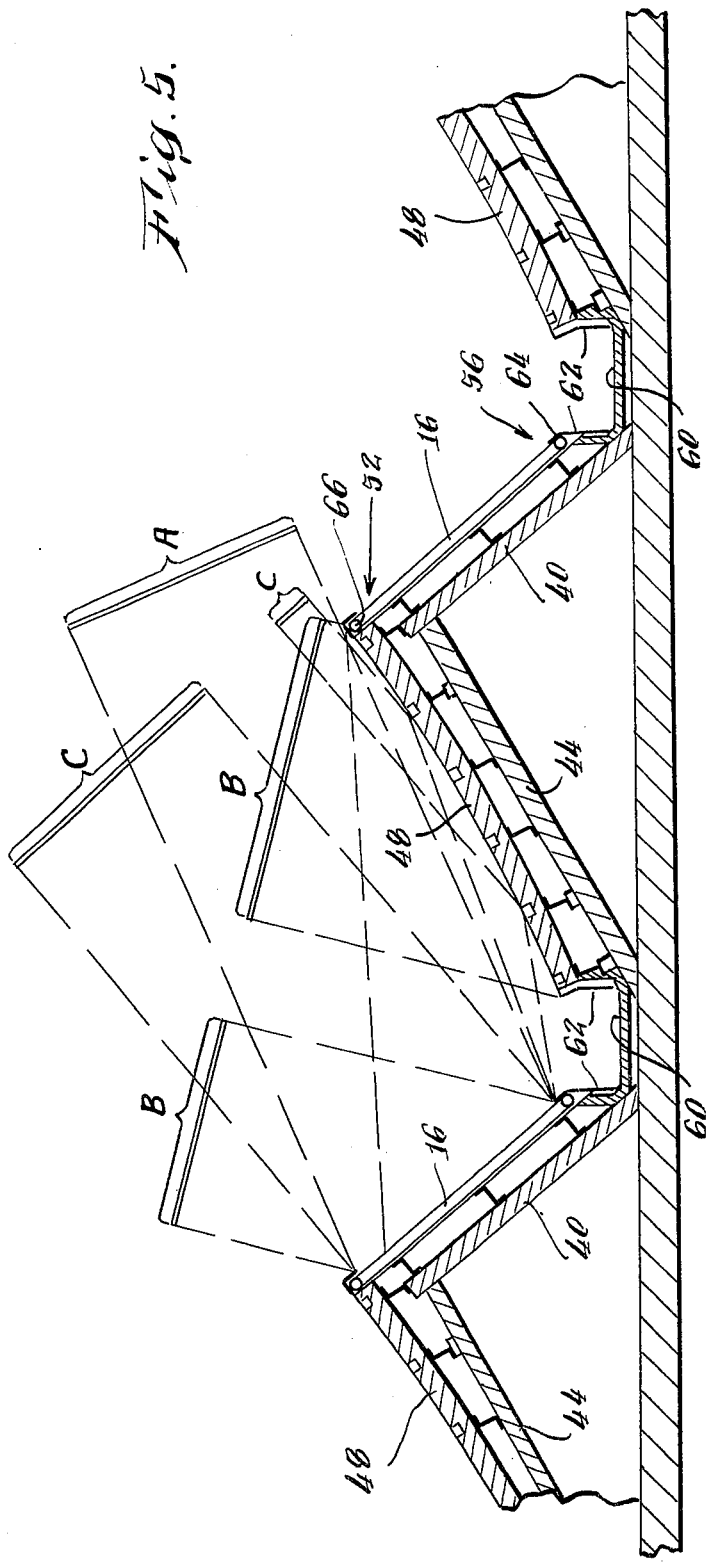

SOLAR ENERGY COLLECTING SYSTEM

BACKGROUND OF THE INVENTION

1. Field of the Invention

The present invention relates to a solar energy collecting system which can be used to heat residential, commercial, or industrial buildings and to power an absorption cooler to air condition such buildings. Further, energy collected by this system can be converted to other forms for many different uses.

Recent experience has demonstrated that the earth's natural energy resources are limited and as supplies of once plentiful energy sources such as petroleum dwindle, their cost increases rapidly. Furthermore, the costs of still relatively abundant energy resources such as coal have also increased because of the environmental impact of recovering them in usable form and because of the relative lack of abundance of types and grades which can be used without severe environmental repercussions. Still other natural energy resources like nuclear and geothermal power require enormous capital as well as lead-time to make them practical on a large scale. Moreover, the environmental ramifications of their use is not yet fully understood or appreciated.

These and other factors have intensified the search for sources of energy alternative to those in common use today. For many reasons, solar energy is a primary target of this investigation. First, it is for all intents and purposes, inexhaustible. Second, it is abundant. The total energy consumed in the United States in 1970 was equivalent to the energy of sunlight received by 4300 square miles of land, that is, only 0.15 percent of the total land area of the continental United States, in that same year, J. R. Williams, "Solar Energy, Technology and Applications", p. 3, (1974). Moreover, the spiralling costs for energy from presently tapped sources has made solar energy economically feasible. Thus, the NSF/NASA Solar Energy Panel has concluded that three broad applications for solar energy are "most promising from technical, economic, and energy quantity standpoints. These are: (1) the heating and cooling of residential and commerical buildings, (2) the chemical and biological conversion of organic materials to liquid, solid, and gaseous fuels, and (3) generation of electricity." The Panel has also concluded that "solar energy can be developed to meet sizable portions of the Nation's future energy needs." P. Donovan and W. Woodward, "An Assessment of Solar Energy as a National Energy Resource", NSF/NASA Solar Energy Panel (University of Maryland, December 1972).

2. Description of the Prior Art

Systems for collecting solar energy, which have been developed in response to the search for alternative sources of energy, can be categorized in three basic ways, namely, (1) flat plate collectors with no provision for concentration of the sun's radiant energy on them, (2) medium performance radiation concentrating collectors which utilize, for example, a parabolic cylinder to focus the sun's radiant energy on a heat exchange device such as a collector pipe through which water circulates, and (3) high performance radiation concentrating collectors which utilize parabolic concentrators or concentrators composed of many flat mirrors focused on the same point, J. Williams, "Solar Energy, Technology and Applications", p. 17, (1974).

Flat plate collectors are ordinarily used to heat a fluid medium such as circulating water which is, in turn, used to heat or cool buildings or to heat water for use in those buildings. Typically, these collectors include a plate having a radiation absorbing coating which forms the bottom of an insulated box. A transparent window of glass or plastic, which tends to be opaque to infrared radiation and to retard convective heat transfer inside the box, transmits sunlight to the absorbing plate which is then heated. The fluid medium is circulated under, through, or over the plate where is consequently is heated. See, for example, U.S. Pats. Nos. 3,387,602; 3,469,539; 3,236,294; and 3,215,134, all to H. E. Thomason. However, these flat plate collctors achieve a maximum efficiency of about only 60 percent at relatively low outlet temperatures.

Solar radiation concentrating systems are used to produce higher temperatures. The focus of the concentrator is usually maintained on a heat exchange unit by making one or the other movable in an attempt to achieve maximum performance. For example, U.S. Pats. Nos. 3,254,643 and 3,270,739 both to Thomason and U.S. Pat. No. 3,841,302 to G. Falbel disclose systems having fixed radiation collectors, but having reflectors or concentrators which include at least a portion that is movable. However, provision of movable reflectors or collectors adds to the complexity and, hence, expense of the systems. These patents also suggest that the reflectors can be used to protect the collectors from the elements as well as to reradiate energy back toward the sky to achieve a cooling effect.

U.S. Pat. No. 2,625,930 (Harris) discloses a system which employs a series of parallel reflectors which focus sunlight through a complementary series of windows to be transmitted to hollow beams that contain a heat absorbing medium. However, maintenance of this structure is difficult since the beams are not readily accessible from the upper surface of the reflector nor are the reflectors themselves readily accessible. Further, this system is designed to reflect solar radiation away from the windows and, hence, the hollow beams in the summer.

U.S. Pat. No. 3,232,795 (Gillette et al.) discloses a system which employs wedge-shaped reflectors to concentrate solar radiation on solar cells mounted horizontally between the reflectors. The system, intended for use in outer space, can then generate electricity. This system's primary objectives are to fully illuminate the solar cells while dissipating heat about them. The cells may be faced toward the sun at anytime.

Known solar energy collecting systems of the types described above have certain drawbacks. Simple flat plate energy collectors have limited efficiency and low outlet temperatures. Maintenance of collectors and reflectors of more complicated systems is made difficult by the limited access which is provided to their components. Perhaps more importantly, however, these more complex systems are designed to generate usable energy only on a limited seasonal basis. With the exception of the Gillette device which is designed for use in space, each is constructed to dissipate or to avoid collection of solar energy during at least a portion of the year, usually summer, to prevent heat from being accumulated by a collector. Thus, certain designs shield the collector during the summer; others reflect the sun's energy away from the collector at that time. In both cases, the collector is effectively turned off and not utilized, thus, greatly decreasing the overall year-long operating efficiency of the system.

SUMMARY OF THE INVENTION

In a preferred embodiment to be described below in detail, the solar energy collecting system of the present invention utilizes radiant energy from the sun to directly heat a fluid medium which can be used to heat residential, commercial, or industrial buildings and to power an absorption cooler to air condition such buildings. The energy stored in the heated fluid medium may also be converted to other forms of energy for various other uses. This system is designed to collect solar energy throughout the year for overall performance which greatly exceeds that of simple flat plate solar energy collectors. Moreover, this sytem requires minimal maintenance but, should maintenance be required, all of its energy collecting components are readily accessible.

The solar energy collecting system of the present invention is adapted to be installed on the roof of a building or on any other fixed horizontal base and comprises a plurality of elongate rows of solar energy collecting panels which may be of the flat plate type. Each panel has a radiant solar energy collecting surface, which preferably has a selective coating, mounted at an angle to the base and facing the sun's position at solar noon. In the northern hemisphere this energy collecting surface, then, faces south. Further, each panel has an upper horizontal edge and a lower horizontal edge.

A device such as a pump is provided to circulate a fluid medium, usually water, in heat conducting contact to the solar energy collecting surface to be heated by the radiant solar energy.

A plurality of elongate rows of reflectors is also mounted on the base, each row having an upper horizontal edge and a lower horizontal edge. The upper horizontal edge in each row of reflectors is mounted adjacent an upper edge of a row of panels to accordingly define a single, inverted, generally V-shaped peak. The lower edge of each reflector row which forms a part of one peak is spaced from the lower edge of the opposing panel row which forms a part of an adjacent peak, to define a valley. A plurality of walkways is positioned on the base and is associated with each of these valleys to provide convenient access to the panels and reflectors for installation and maintenance and also to provide adequate drainage for rain and snow. Accordingly, the collector rows, reflector rows, and walkways give a sawtoothed appearance.

All components of this solar energy collecting system with the exception of a fluid circulating system are mounted in fixed positions above the base and may be easily reached from the access walkways. Accordingly, this system may be more easily maintained than prior art systems which mount certain components below the base surface or which provide no access at all to the components mounted above the base surface. Further, since the collector panels and reflectors are fixed, capital investment and continuing maintenance costs of more complicated systems having moving components is avoided.

Year-long operation of the system of the present invention to generate energy is achieved by a construction which avoids shadows that might otherwise fall on any of the collector panels from any of the peaks. In particular, the height of each of the peaks and the horizontal distance between adjacent peaks are set to minimize shading of the respective collectors near noon on the winter solstice, the day during which the sun achieves its lowest solar altitude during the year.

Further, maximum performance of this solar energy collecting system is achieved during any desired season by making the plane tangent to the surface of each reflector at its upper edge form an angle with the horizon or base greater than one-half the solar altitude at solar noon during that season. For example, if maximum performance is desired during the summer, when the system may be used to power absorption coolers for air conditioning, the plane tangent to the surface of each reflector at its upper edge is made to form an angle with the base greater than one-half the solar altitude at solar noon on the summer solstice. As will be explained in detail below, this relationship between the reflector mount and the base insures that most reflected solar energy is incident on the collector during the desired season, since all radiation reflected from the top of the reflector is inclined downwardly.

Accordingly, it is an object of the present invention to provide an easily maintained solar energy collecting system which may be used throughout the year to produce usable energy for heating or cooling buildings or which may be converted to other forms of energy for other purposes.

Other objects, aspects, and advantages of the present invention will be pointed out in or will be understood from the following detailed description provided below in conjunction with the accompanying drawings.

BRIEF DESCRIPTION OF THE DRAWINGS

FIG. 1 is a perspective view of the system of the present invention installed on the horizontal roof of a building which may be a factory, school or residence.

FIG. 4 is a vertical cross-sectional view of the components of the system which are installed on the roof. Various parameters of these components are illustrated.

FIG. 5 is a vertical cross-sectional view similar to that shown in FIG. 4 which illustrates operation of these various components at specific times during the year.

DETAILED DESCRIPTION OF THE PREFERRED EMBODIMENT

Figure 3:
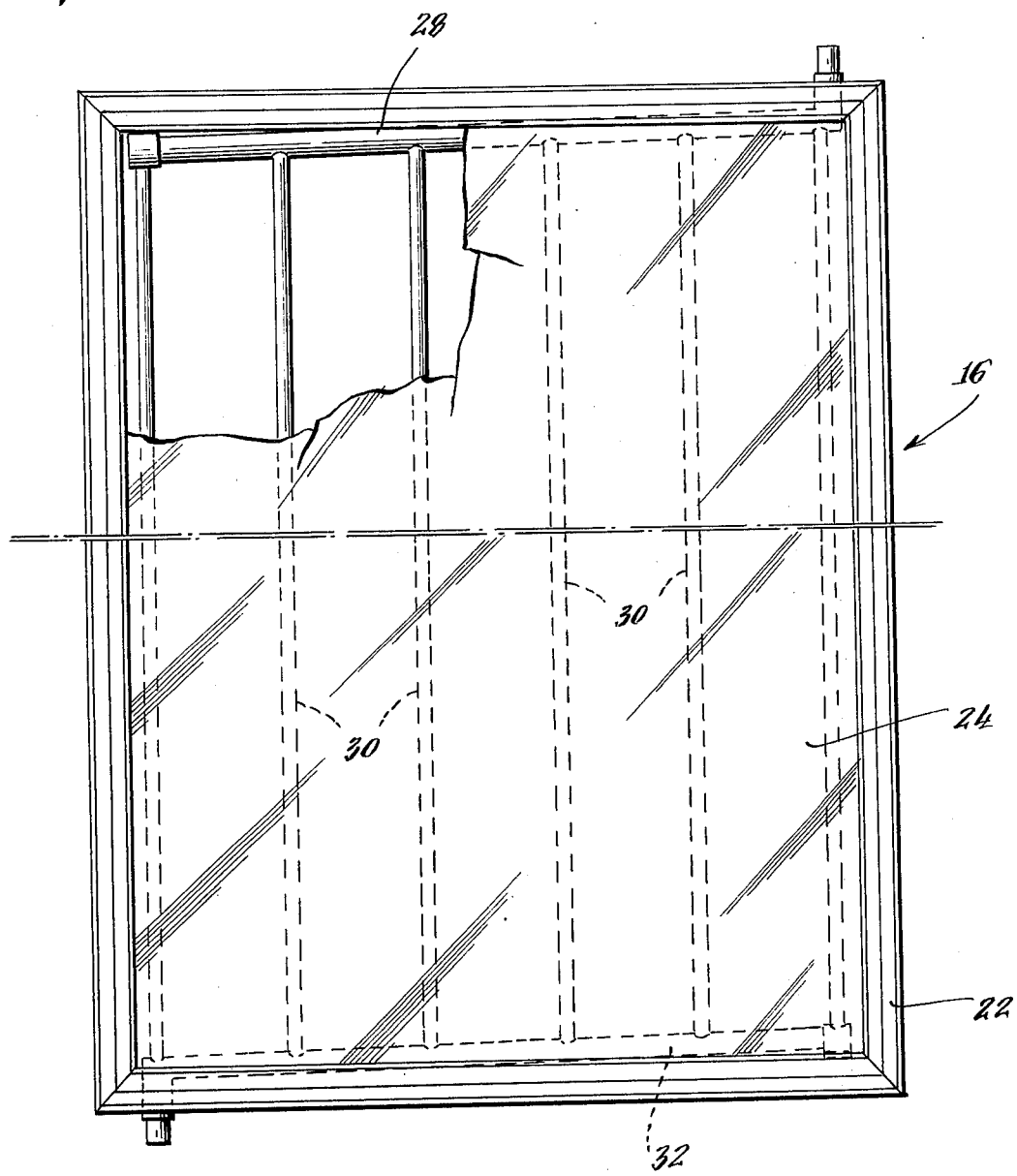
FIG. 3 is a top plan view of this solar energy collecting panel.

Referring first to FIG. 1, the solar energy collecting system of the present invention is illustrated installed on the horizontal flat roof 10 of a building 12 which may, for example, be a school, factory, or office building or which may be any other type of residential, commercial, or industrial building. However, this system may be installed on any flat base which is preferably horizontal.

The system comprises a series of elongate rows 14 of a number of solar energy collecting panels 16, each mounted to face the sun's position at solar noon. The collector panels may be of the type which heats water or another fluid medium for subsequent use, or they may be of the photoelectric type which converts the sun's radiant energy. Alternatively, these collectors may be of any other type which collects radiant solar energy for subsequent use in another form. For convenience, the present invention will be described with reference to a liquid heating collector.

Complimenting each row of solar energy collecting panels is an elongate solar energy concentrator or reflector 18 which focuses radiant solar energy on the collector panels in a manner to be described in greater detail below.

Figure 2:
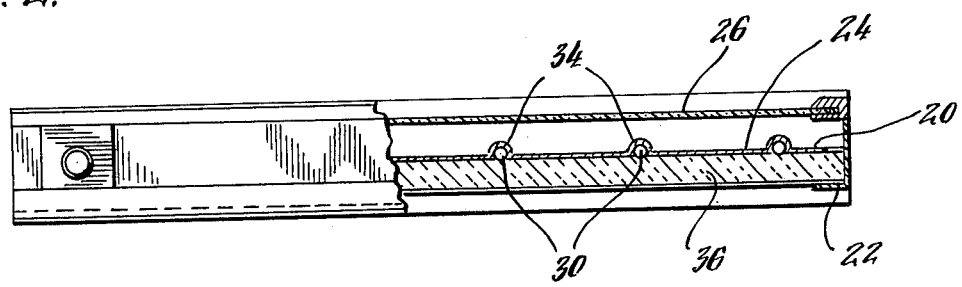
FIG. 2 is a cross-sectional view of a solar energy collecting panel suitable for use with the system of the present invention.

FIGS. 2 and 3 illustrate a suitable solar energy collecting panel for use in the system of the present invention. This panel includes a main plate 20 that is mounted in a frame 22 and that has a flat black or, preferably, a selective coating 24 which absorbs radiant solar energy and is thus heated. A selective coating is desirable since it has a high absorptivity, i.e., a low reflectivity, for incident sunlight and a high reflectivity, i.e. a low absorptivity, for infrared heat. The low infrared absorptivity results in reduced radiant heat loss so that the collector efficiency is improved and temperatures higher than that which can be reached with a black coated main plate can be achieved.

The collector panel further includes one or more transparent windows 26 which transmit sunlight to the energy absorbing coating 24, tend to be opaque to infrared reradiation from the plate 20, and also retard convective heat transfer from the plate. Accordingly, the plate is heated by the solar radiation. A system for circulating a fluid medium in heat conducting contact with the heated plate comprises an inlet manifold 32 that communicates in parallel with a series of vertically extending tubes 30 that ultimately lead to an outlet manifold 28. As shown in FIG. 2, tubes 30 are continuously soldered into arcuate depressions 34 formed in the bottom of main plate 20 to improve the heat transferring contact between the tubes and plate.

A layer of insulation 36 is also mounted in frame 22 below plate 20 to retard heat transfer through the bottom of panel 16 and, thus, to improve the efficiency of the heat transfer from the plate 20 to water circulated in tubes 30.

As shown in FIG. 4, each of the solar energy collecting panels 16 is mounted on a series of purlins 38 carried on a rafter 40 which is fixed to building roof 10 at an angle $\epsilon$. Accordingly, the angle $\epsilon$ determines the angle at which collector panels 16 are mounted to face the sun. Each reflector 18 is also mounted on a number of purlins 42 which are carried on a rafter 44 that forms an interior peak 46 with one collector supporting rafter 40. The reflectors may be parabolic or circular in cross-section. It has been found, however, that the circular cross-section is most easily and economically fabricated. For example, stainless steel can be provided with relatively high reflectivity and easily formed to the circular curve to approximately focus solar radiation onto the collector panels.

As can be seen in FIGS. 4 and 5, a layer of insulation 48 underlies each reflector 18 to retard building heat loss by conduction downwardly through it.

The upper horizontal edge 50 of each row of collector panels is joined to the upper horizontal edge 52 of each row of reflectors by a flashing 54 to form an external peak. Accordingly, the bottom edge 56 of the collector panel row and the bottom edge 58 of an adjacent reflector may be spaced by a distance W to form a valley. A depressed walkway 60, which may be built up roofing or other materials sufficiently durable to withstand the installation and maintenance of roof-mounted equipment, is positioned in each valley formed between respective collector-reflector peaks and is mounted on roof 10. Suitable flashing 62 extends from the bottom edge 56 of collector panel rows 16 and from the bottom edge 58 of reflectors 18 into the walkway to prevent leakage.

Walkway 60 provides a convenient access to both the reflectors and collectors for installation and maintenance. Thus, in the event that a malfunction occurs, a workman can easily reach the defective area and may also transport repair equipment with him in walkways 60. Furthermore, these walkways provide drainage from the surfaces of the collectors and reflectors for rain and snow. Accordingly, the walkways may be canted slightly from the center to the edges to form suitable gutters or may be provided with roof drains at their centers and be canted slightly theretoward. In either case, the system of the present invention is essentially self-cleaning. If the reflectors are made from a corrosion resistant material such as stainless steel and if the collectors are provided with an upper transparent pane of glass, the natural process of rain and snow will wash dirt and other debris from them. However, if further cleaning becomes necessary, walkway 60 provides easy access to the facing surfaces of the collectors and reflectors for doing so.

The system of the present invention may be adapted to operate in conjunction with any form of device which utilizes the heated water produced in the collectors 16. Accordingly, all collectors in a given row are connected in parallel to an inlet header 64 (FIGS. 4 and 5) which runs along the bottom edge 56 of the collector and conducts water to each of the individual panels to be circulated through the circulation tubing 30. Further, each panel in a row is connected to an outlet header 66 from which water that has now been heated is circulated by means of a pump (not shown) through a supply main (not shown) to a device (not shown) for utilizing the heated water. For example, this device may be an absorption chiller which operates in a well-known manner to provide air conditioning for building 12 during the summer months. Further, the system may be provided with an alternative circuit which is connected in a well-known manner to heat the building 12 during the winter months. Further, the system must also be provided with a means of storing the heated water or the chilled water or both to allow for operation of building heating and air conditioning systems when insufficient solar energy is collected. Moreover, the system should also be provided with an auxiliary heating system to be used during prolonged periods when insufficient solar energy is collected. Both the absorption chiller and heating circuit are connected to a return main (not shown) which again leads to the inlet headers 64 of collector panels 16.

The design of the system of the present invention which permits it to be used year-long for both air conditioning and heating purposes may be explained with reference to FIGS. 4 and 5. In particular, this system is designed so that the collector panels 16 are seldom shaded by an adjacent reflector-collector peak. Accordingly, the minimum amount of solar radiation flux to the collector is that provided by direct radiation. Thus, if:

$H$ = the effective height of collector panel,
$h$ = the height of flashing 54,
$H_t = H + h$, total collector assembly height,
$\epsilon$ = the angle of inclination of each collector panel,
$D$ = the linear distance between adjacent reflector-collector peaks, $\gamma$ = solar azimuth angle measured from a plane perpendicular to top edge of a collector or reflector row, $\beta$ = solar altitude above horizon, $$\beta_a = \tan^{-1}\left(\frac{\tan \beta}{\cos \gamma}\right),$$

apparent solar altitude seen by the collector rows, $$\beta_l = \tan^{-1}\left(\frac{H_t \sin \epsilon}{D - H_t \cos \epsilon}\right),$$

solar altitude at which shadow just begins to fall on the lower edge of collector, For no shadow to fall on the lower edge of the collector, $\beta_a = \beta_l$, or $$D = \frac{H_t \sin \epsilon \cos \gamma}{\tan \beta} + H_t \cos \epsilon$$

Then D, may be set in terms of $H_t$ and $\epsilon$ for the particular latitude at which the system is installed so that no shadow from one collector-reflector peak falls on an adjacent collector near solar noon on the winter solstice. This, of course, is the day during which the sun achieves its lowest maximum altitude. Accordingly, on all other days of the year, the sun is higher in the sky at solar noon and the entire solar collector panel will be exposed to its direct radiation. This relationship is shown in FIG. 5 by the column of sunlight A incident directly on solar panels 16 at solar noon on the winter solstice.

Further, if it is assumed that maximum performance of the system is desired for the summer when air conditioning is desirable, then all reflected light should also be incident on the collectors in addition to the directly incident sunlight. That is, reflected light from reflectors 18 should not overshoot or undershoot either the upper or lower edges of the collector panels. To achieve this result, the angle $\lambda$, that is the angle which a plane tangent to the upper edge 52 of each reflector 18 makes with the horizon or with roof 10, is fixed to be greater than one-half the solar altitude at solar noon on the summer solstice. This feature insures that the rays of sunlight reflected from the upper reflector edge will be inclined downwardly. Since the height of the upper collector edge above the roof 10 is substantially equal to the height of the upper reflector edge, this reflected ray is incident on and cannot overshoot the collector. Further, the reflector is contoured so that a ray of sunlight incident on the bottom reflector edge is also reflected toward the collector. Thus, the radius R of reflector 18 is fixed to achieve this result. The incidence of direct and reflected sunlight at noon on the summer solstice is illustrated by columns of light B shown in FIG. 5.

The solar energy collecting system illustrated in FIGS. 4 and 5 has been designed for a location at 40° North latitude.

Ordinarily, the angle of inclination of the collector panels $\epsilon$ should be larger than the optimum for installation of these collector panels without reflectors. This improves the performance when the reflectors are added.

The width W of walkway 60 should be kept to a minimum required for installation and service of the collectors, roofing, and reflectors. An unnecessary increase in W will decrease the overall performance of the system. Furthermore, the height E, i.e. the vertical distance between the bottom edge 56 of the collectors and the bottom edge 58 of the reflectors determines performance of the energy collecting system largely at low solar altitudes. This distance, too, should be kept to a minimum.

Accordingly, the system as described above collects all energy in December from direct solar radiation. The reflector is totally shaded. In March, most of the energy is collected from direct solar radiation, but some is collected from that which is reflected. This relationship is shown in FIG. 5 by the columns of sunlight C. In June some energy is collected from direct radiation, but most is from reflected radiation. All energy that strikes the reflector is reflected to the collector. This design maximizes the system performance during the summer months when air conditioning is required.

For example illustrated, the total solar radiation falling on the collector is increased by 135 percent during the air conditioning season. Furthermore, this increase also increases collector efficiency significantly so that system output is increased to 260 percent of the output of a similar system without reflectors.

Though the system described has been designed for optimum performance during the summer months when air conditioning is required, it may be designed for optimum performance during other seasons. This performance is achieved by making all of the reflected solar radiation incident upon the collector during the season of desired maximum performance by fixing the dimensions of the system in the manner described above. Accordingly, the angle $\lambda$ should be made greater than one-half the solar altitude at solar noon during the season when optimum performance is desired.

Although a specific embodiment of the present invention has been described above in detail, it is to be understood that this is only for purposes of illustration. Modifications may be made to the described structure by those skilled in the art in order to adapt this solar energy collecting system to particular applications.

What is claimed is:

1. A solar energy collecting system comprising:
   A. stationary solar energy collector means having a radiant solar energy collecting surface mounted at an angle to the horizon and generally facing the sun's position at solar noon to receive radiant solar energy;
   B. means for conveying collected energy away from said solar energy collecting surface,
   C. stationary, curved reflector means also mounted at an angle to the horizon for reflecting solar energy to said collector; and
   D. walkway means between said collector means and reflector means for providing drainage from and access for maintenance to both of said collector and reflector means.

2. The solar energy collecting system as claimed in claim 1 wherein
   said collector means comprises a plurality of elongate rows of solar energy collector panels each having an upper and a lower edge;

said reflector means comprises a plurality of elongate rows of reflectors each having an upper and a lower edge, said upper edge of each reflector row being adjacent an upper edge of a collector panel row to define an inverted, generally V-shaped peak; said lower edge of the reflector forming part of one peak being spaced from the lower edge of the collector panel forming part of a peak adjacent said one peak to define a valley; and said walkway means comprises a plurality of walkways each associated with one of said valleys defined between adjacent reflector-collector peaks;

said panel rows, reflector rows and walkways being arranged to give a sawtoothed appearance.

3. The solar energy collecting system as claimed in claim 2 wherein the height of each of said peaks and the horizontal distance between said peaks are such that substantially no shadow from said peaks falls on said collector panels during the energy collecting hours near noon on the winter solstice.

4. The solar energy collecting system as claimed in claim 2 wherein a plane tangent to the surface of each reflector at its upper edge makes an angle with the horizon greater than one-half the solar altitude at noon during the season when greatest solar energy collecting system performance is desired.

5. The solar energy collecting system as claimed in claim 4 wherein said plane tangent to the surface of each reflector at its upper edge makes an angle with the horizon greater than one-half the solar altitude at noon on the summer solstice to yield greatest solar energy collecting system performance during the summer.

6. The solar energy collecting system as claimed in claim 4 wherein each reflector is contoured to reflect solar radiation from its entire length to said collector panel forming part of an adjacent peak for selected limits of solar position.

7. A solar energy collecting system comprising
A. a substantially horizontal base
B. a plurality of elongate rows of solar energy collecting panels mounted on said base, each panel having
  1. a stationary radiant solar energy collecting surface mounted at an angle to the base and generally facing the sun's position at noon to receive radiant solar energy,
  2. an upper horizontal edge and
  3. a lower horizonal edge
C. means for conveying collected energy away from said solar energy collecting surface,
D. a plurality of elongate rows of stationary curved reflectors also mounted on said base, each having
  1. an upper horizontal edge and 2. a lower horizontal edge;
said upper edge of each reflector row being adjacent to an upper edge of a collector panel row to define an inverted, generaly V-shaped peak, said lower edge of the reflector row forming part of one peak being spaced from the lower edge of the collector panel row forming part of an adjacent peak to define a valley, and
E. a plurality of walkways positioned on said base each associated with one of said valleys defined between adjacent reflector-collector peaks to provide drainage for and access for maintenance to said panel rows and reflector rows;
said collector panel rows, reflector rows, and walkways being arranged to give a sawtoothed appearance.

8. The solar energy collecting system as claimed in claim 7 wherein the height of each of said peaks and the horizontal distance between said peaks are such that substantially no shadow from said peaks falls on said collector panels during the energy collecting hours near noon on the winter solstice.

9. The solar energy collecting system as claimed in claim 7 wherein a plane tangent to the surface of each reflector at its upper edge makes an angle with said base greater than one-half the solar altitude at noon during the season when greatest solar energy collecting system performance is desired.

10. The solar energy collecting system as claimed in claim 7 wherein said plane tangent to the surface of each reflector at its upper edge makes an angle with said base greater than one-half the solar altitude at noon on the summer solstice to yield greatest solar energy collecting system performance during the summer.

11. The solar energy collecting system as claimed in claim 7 wherein each reflector is contoured to reflect solar radiation incident on its entire length onto said collector row forming part of an adjacent peak for selected limits of solar position.

12. A solar energy collecting system comprising
A. a substantially horizontal base
B. a plurality of elongate rows of solar energy collecting panels mounted on said base, each panel having
  p2 1. a stationary radiant solar energy collecting surface mounted at an angle to the base and generally facing the sun's position at noon to receive radiant solar energy,
  2. an upped edge and
  3. a lower horizontal edge
C. means for conveying collected energy away from said solar energy collecting surface
D. a plurality of elongate rows of stationary curved reflectors also mounted on said base, each having
  1. an upper horizontal edge and 2. a lower horizontal edge,
said upper edge of each reflector row being adjacent to an upper edge of a collector panel row to define an inverted, generally V-shaped peak, said lower edge of the reflector row forming part of one peak being spaced from the lower edge of the collector panel row forming part of an adjacent peak to define a valley, the height of each of said peaks and the horizontal distance between said peaks being such that substantially no shadow from said peaks falls on said collector panels during the energy collecting hours near noon on the winter solstice, and the plane tangent to the surface of each reflector at its upper edge making an angle with said base greater than one-half the solar altitude at solar noon on the summer solstice, and each reflector is contoured to reflect solar radiation incident on its entire length onto said collector row forming part of an adjacent peak for selected limits of solar position, and
E. a plurality of walkways positioned on said base each associated with one of said valleys defined between adjacent reflector-collector peaks to provide drainage for and access for maintenance to said collector panel rows and reflector rows;
said collector panel rows, reflector rows, and walkways being arranged to give a sawtoothed appearance.

* * * * *